United States Patent [19]

Cavitt

[11] Patent Number: 4,855,385

[45] Date of Patent: Aug. 8, 1989

[54] MONOCARBOXYLIC ACID DERIVATIVES OF ALIPHATIC BASED EPOXY RESINS

[75] Inventor: Michael B. Cavitt, Lake Jackson, Tex.

[73] Assignee: The Dow Chemical Company, Midland, Mich.

[21] Appl. No.: 210,065

[22] Filed: Jun. 22, 1988

[51] Int. Cl.[4] ............... C08G 59/16; C08G 59/06; C08G 59/30

[52] U.S. Cl. .................. 528/97; 528/98; 528/111.5; 528/364; 525/534

[58] Field of Search ............ 528/97, 98, 364, 111.5; 525/534, 533

[56] References Cited

U.S. PATENT DOCUMENTS

| | | | |
|---|---|---|---|
| 2,759,901 | 8/1956 | Greenlee | 528/111.5 |
| 2,867,591 | 1/1959 | Lederman | 528/111.5 X |
| 3,144,421 | 8/1964 | Yost | 260/18 |
| 3,507,819 | 4/1970 | Vegter et al. | 260/18 |
| 3,598,775 | 8/1971 | Huggard | 260/18 |
| 4,098,735 | 7/1978 | Tobias | 528/111.5 X |
| 4,145,323 | 3/1979 | Sekmakas | 528/111.5 X |
| 4,252,935 | 2/1981 | Anderson et al. | 528/45 |
| 4,357,456 | 11/1982 | Lopez et al. | 528/111.5 |
| 4,413,015 | 11/1983 | Anderson et al. | 528/111.5 X |
| 4,486,556 | 12/1984 | Kordomenos et al. | 523/400 |
| 4,663,400 | 5/1987 | Wang et al. | 528/97 X |
| 4,721,743 | 1/1988 | Cavitt et al. | 523/427 |
| 4,764,571 | 8/1988 | Namba et al. | 528/97 X |

OTHER PUBLICATIONS

CA 86:156522h (1977).
CA 96:200726k (1982).
CA 105:154121p (1986).
CA 87:118732q (1977).
Derwent Abs. 79546Y/45 (1980).
CA 92:78264h (1980).
CA 105:116736k (1986).
Derwent Abs. 64506 C/37 (1985).
Karel Dusek (Editor) in "Epoxy Resins and Composites III", *Advances in Polymer Science*, vol. 78, pp. 1–59 (1986).
Libor Matejka, Svatopluk Pokomy and Karel Dusek in "Network Formation Involving Epoxide and Carboxyl Groups (Course of the Model Reaction Monoepoxide-Monocabonic Acid)", *Polymer Bulletin*, vol. 7, pp. 123–128 (1982).

Primary Examiner—Earl Nielsen

[57] ABSTRACT

A low viscosity product is obtained when an adduct is prepared by reacting (A) at least one polyglycidyl ether of: (1) a compound containing an average of more than one hydroxyl group per molecule and also at least one cycloalkadiene or oligomer of a cycloalkadiene per molecule or (2) a compound represented by the formula HO—(—A—Y—)$_n$—A—OH wherein each A is independently a divalent hydrocarbyl group having from about 2 to abut 6 carbon atoms; each Y independently is —S— or —S—S—; and n has a value from 1 to about 11; with (B) at least one aliphatic monocarboxylic acid containing from about 6 to about 18 carbon atoms per molecule; wherein components (A) and (B) are present in amounts which provide a ratio of carboxylic acid group per epoxide group of from about 0.01:1 to about 0.2:1.

40 Claims, No Drawings

MONOCARBOXYLIC ACID DERIVATIVES OF ALIPHATIC BASED EPOXY RESINS

FIELD OF THE INVENTION

The present invention concerns modified epoxy resins. Particularly, it concerns monocarboxylic acid modified polyepoxy resins so as to reduce the viscosity of the resin.

BACKGROUND OF THE INVENTION

Epoxy resins have been employed to prepare coatings, encapsulations, moldings, laminates and the like. However, in many applications they are applied from organic solvents. It is desirable from an environmental standpoint to reduce the viscosity of the epoxy resin so as to reduce the amount of organic solvent necessary to achieve the desired application viscosity. One method for reducing the viscosity of epoxy resin coating compositions is to employ a low viscosity additive. In many instances, these additives are expensive and in some instances may be skin sensitizers. It would therefore be desirable to have alternative means for reducing the viscosity of epoxy resins.

SUMMARY OF THE INVENTION

One aspect of the present invention pertains to an adduct of (A) at least one polyglycidyl ether of (1) a compound containing an average of more than one hydroxyl group per molecule and also at least one cycloalkadiene or oligomer of a cycloalkadiene per molecule or (2) a compound represented by the formula HO—(—A—Y—)$_n$—A—OH wherein each A is independently a divalent hydrocarbyl group having from about 2 to about 6 carbon atoms; each Y independently is —S— or —S—S—; and n has a value from 1 to about 11; and (B) at least one aliphatic monocarboxylic acid containing from about 6 to about 18 carbon atoms per molecule; wherein components (A) and (B) are present in amounts which provide a ratio of carboxylic acid groups per epoxide group of from about 0.01:1 to about 0.2:1.

Another aspect of the present invention pertains to a thermosettable composition comprising the aforementioned adduct and a curing amount of a suitable curing agent therefor.

A further aspect of the present invention pertains to the cured product resulting from subjecting the aforementioned thermosettable composition to conditions sufficient to effect curing thereof.

Another aspect of the present invention pertains to a process for lowering the viscosity of a polyglycidyl ether of (1) a compound containing an average of more than one hydroxyl group per molecule and also at least one cycloalkadiene or oligomer of a cycloalkadiene per molecule or (2) a compound represented by the formula HO—(—A—Y—)$_n$—A—OH wherein each A is independently a divalent hydrocarbyl group having from about 2 to about 6 carbon atoms; each Y independently is —S— or —S—S—; and n has a value from 1 to about 11 by reacting said polyglycidyl ether with an aliphatic monocarboxylic acid having from about 6 to about 18 carbon atoms.

The present invention therefore provides an alternative method for reducing the viscosity of epoxy resins.

DETAILED DESCRIPTION OF THE INVENTION

The adducts of the present invention can be prepared by reacting the epoxy resin, component (A), with the monocarboxylic acid, component (B), at a temperature suitably from about 110° to about 190° C., more suitable from about 140° C. to about 180° C., most suitable from about 155° to C. to about 175° C., for a time suitable to complete the desired reaction which is suitably from about 0.5 to about 3, more suitably from about 1 to about 2, most suitably from about 1 to about 1.5, hours. At the lower temperatures, longer reaction times are required whereas at the higher temperatures less reaction times are required to complete the reaction. At temperatures above about 190° C. and at the longer reaction times, undesired reactions may occur such as those disclosed by Karel Dusek (Editor) in "Epoxy Resins and Composites III", *Advances in Polymer Science*, vol. 78, pp 1-59 (1986) and Libor Matejka, Svatopluk Pokomy and Karel Dusek in "Network Formation Involving Epoxide and Carboxyl Groups (Course of the Model Reaction Monoepoxide-Monocabonic Acid)", *Polymer Bulletin*, vol. 7, pp 123-128 (1982), both of which are incorporated herein by reference in their entirety. At temperatures below about 110° C., the reaction time becomes longer which may be inconvenient.

The reaction can be conducted at any suitable pressure from subatmospheric to superatmospheric; however, atmospheric pressure, for convenience, is preferred.

The epoxy resin and the monocarboxylic acid are employed in amounts which provide a ratio of equivalent of carboxylic acid to epoxide equivalent suitably from about 0.01:1 to about 0.2:1, more suitably from about 0.02:1 to about 0.15:1, most suitably from about 0.03:1 to about 0.1:1.

If desired, the reaction can be conducted in the presence of a suitable catalyst for the reaction between an epoxy group and a carboxylic acid group. Suitable such catalysts include, for example, phosphonium compounds, tertiary amines, and the like.

Suitable tertiary amine catalysts include, for example, triethylamine, tributylamine, benzyldimethylamine, tris(dimethylaminomethyl)phenol, dimethylethanolamine, n-methylmorpholine, combinations thereof and the like.

Suitable phosphonium compounds include, for example, those disclosed by Dante et al. in U.S. Pat. No. 3,477,990, by Perry in Canadian Pat. No. 893,191 and U.S. Pat. No. 3,948,855, and Tyler, Jr. et al. in U.S. Pat. No. 4,366,295, all of which are incorporated herein by reference. Particularly suitable phosphonium catalysts include, for example, ethyl triphenyl phosphonium acetate.acetic acid complex, ethyl triphenyl phosphonium chloride, ethyl triphenyl phosphonium iodide, ethyl triphenyl phosphonium phosphate, tetrabutyl phosphonium acetate.acetic acid complex, tetrabutyl phosphonium chloride, tetrabutyl phosphonium iodide, tetrabutyl phosphonium phosphate, combinations thereof and the like.

The amount of catalyst to be employed is that amount which will effectively catalyze the reaction between the epoxy resin and the monocarboxylic acid. The specific amount of catalyst will depend upon the particular reactants and catalyst being employed. Generally, the catalyst is employed in amounts suitably from about 0.0002 to about 0.004, more suitably from about 0.0004 to about 0.002, most suitably from about 0.0005 to about 0.001, mole of catalyst per epoxide equivalent.

Suitable aliphatic monocarboxylic acids which can be employed herein include those represented by the following Formula I

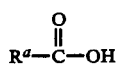

Formula I wherein $R^a$ is a monovalent hydrocarbyl group having suitably at from 5 to 17, more suitably from about 7 to about 15, most suitably from about 8 to about 13, carbon atoms. Particularly suitably monocarboxylic acids include, for example, hexanoic acid, heptanoic acid, octanoic acid, pelargonic acid (nonanoic acid), decanoic acid, lauric acid (dodecanoic acid), myristic acid (tetradecanoic acid), pentadecanoic acid, hexadecanoic acid, heptadecanoic acid, octadecanoic acid, combinations thereof and the like.

Suitable polyglycidyl ethers of hydroxyl containing compounds which can be employed herein include, the diglycidyl ethers of phenol- or substituted phenolcyclopentadiene or oligomers of cyclopentadiene resins as well as the glycidyl ethers of sulfur containing diols polyols. Suitable such epoxy resins include, for example, those represented by the following Formulas II and III:

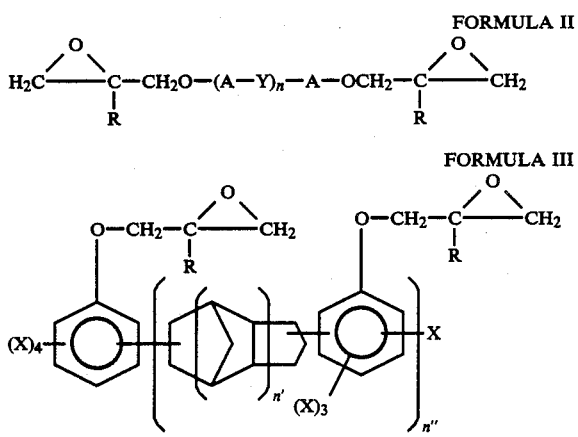

wherein each A is independently a divalent hydrocarbyl group having suitably from about 2 to about 6, more suitably from about 2 to about 5, most suitably from about 2 to about 4, carbon atoms; each R is independently hydrogen or an alkyl group having from 1 to about 4 carbon atoms, preferably hydrogen or methyl, most preferably hydrogen; each X is independently hydrogen, an aliphatic hydrocarbon group containing from 1 to about 6 carbon atoms, or a halogen, preferebly chlorine or bromine; each Y independently is —S— or —S—S—; n suitably has a value from 1 to about 11, more suitably from about 1 to about 7, most suitably from about 1 to about 5; n' suitably has a value from zero to about 4, more suitably from about 1 to about 3, most suitably from about 1 to about 2; and n" has a value suitably from about 1 to about 4, more suitably from about 1 to about 3, most suitably from about 1 to about 2.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise, the term hydrocarbyloxy means a hydrocarbyl group having an oxygen linkage between it and the object to which it is attached.

Particularly suitable epoxy resins include, for example, the diglycidyl ethers represented by Formula II.

The epoxy resins are suitably prepared by means known for the preparation of epoxy resins from a compound containing hydroxyl groups by reacting such compound with an epihalohydrin in the presence of a suitable catalyst and reacting the resultant intermediate halohydrin ether with a basic acting substance such as an alkali metal hydroxide.

When the hydroxyl group is an aliphatic hydroxyl group, the catalyst is suitably a Lewis acid such as, for example, stannic chloride, boron trifluoride, combinations thereof and the like. When the hydroxyl group is an aromatic hydroxyl group, the catalyst is suitably a tertiary amine, an ammonium compound, a phosphonium compound a phosphine or the like. Particularly suitable such catalysts include, for example, benzyl trimethyl ammonium chloride, sodium hydroxide, potassium hydroxide, combinations thereof and the like.

The epoxy resins represented by, sodium hydroxide, potassium hydroxide, Formula III can be prepared by the methods disclosed in U.S. Pat. No. 4,390,680 which is incorporated herein in its entirety.

The epoxy resin adducts of the present invention can be cured with any suitable curing agent for epoxy resins including, for example, primary and secondary polyamines, carboxylic acids and anhydrides thereof, Lewis acids, phenolic hydroxyl-containing compounds, guanidines, biguanides, polyamides, combinations thereof and the like. Particularly suitable curing agents include, for example, ethylenediamine, diethylenetriamine, triethylenetetramine, adipic acid, phosphoric acid, dicyandiamide, diaminocyclohexane, combinations thereof and the like. The curing agents are employed in an amount which will effectively cure the composition containing the epoxy resin adduct. These amounts will depend upon the particular epoxy resin adduct and curing agent employed; however, suitable amounts include, for example, from about 0.6 to about 1, more suitably from about 0.8 to about 1, most suitably from about 1 to about 1 equivalent of curing agent per epoxide equivalent for those curing agents which cure by reacting with the epoxy group of the epoxy resin. The *Handbook of Epoxy Resins* by Lee and Neville, McGraw-Hill, 1967 contains various discussions concerning the curing of epoxy resins as well as compilation of suitable curing agents. This handbook is incorporated herein by reference.

If desired, the thermosettable compositions of the present invention can be blended with other materials such as solvents or diluents, fillers, pigments, dyes, flow modifiers, thickeners, reinforcing agents, fire retarding or suppressing agents, combinations thereof and the like.

These additives are added in functionally equivalent amounts eg, the pigments and/or dyes are added in quantities which will provide the composition with the desired color; however, they are suitably employed in amounts of from about 5 to about 50, more suitably from about 5 to about 40, most suitably from about 10 to about 40 percent by weight based upon the combined weight of epoxy resin and curing agent.

Solvents or diluents which can be employed herein include, for example, hydrocarbons, ketones, glycol ethers, glycol ether acetates, combinations thereof and the like. Particularly suitable solvents or diluents include, for example, toluene, benzene, xylene, methyl ethyl ketone, methyl isobutyl ketone, diethylene glycol methyl ether, dipropylene glycol methyl ether, propylene glycol methyl ether, dipropylene glycol methyl ether acetate, propylene glycol methyl ether acetate, combinations thereof and the like.

The modifiers such as thickeners, flow modifiers and the like can be suitably employed in amounts of from about 0.05 to about 3, more suitably from about 0.1 to about 3, most suitably from about 0.1 to about 2 percent by weight based upon the combined weight of epoxy resin and curing agent.

Reinforcing materials which can be employed herein include natural and synthetic fibers in the form of woven, mat, monofilament, multifilament, chopped fibers and the like. Suitable reinforcing materials include, glass, ceramics, nylon, rayon, cotton, aramid, graphite combinations thereof and the like.

Suitable fillers which can be employed herein include, for example, inorganic oxides, ceramic microspheres, plastic microspheres, glass microspheres, clay, sand, gravel, combinations thereof and the like.

The fillers can be employed in amounts suitably from about 5 to about 50, more suitably from about 5 to about 40, most suitably from about 10 to about 40 percent by weight based upon the combined weight of epoxy resin and curing agent.

The epoxy resin adducts of the present invention can be formulated for use in such applications as, for example, flooring, casting, molding, adhesives, potting, filament winding, encapsulation, structural and electrical laminates, composites, coatings and the like.

The following examples are illustrative of the present invention, but are not to be construed as to limiting the scope thereof in any manner. The following components are employed in the examples.

EPOXY RESIN A is a diglycidyl ether of a phenol-dicyclopentadiene resin having an average epoxide functionality of about 2.2, an epoxide equivalent weight (EEW) of about 233.7 and a viscosity of about 1528 cps (1.528 Pa.s) at 85° C.

EPOXY RESIN B is the diglycidyl ether of dipropylene glycol having an EEW OF about 191.2 and a viscosity of about 40.5 cks (0.0000405 cm$^2$/s) at 25° C.

EPOXY RESIN C is the diglycidyl ether of polypropylene glycol having an EEW of about 316.2 and a viscosity of about 70.1 cks (0.0000701 cm$^2$/s) at 25° C.

EPOXY RESIN D is the diglycidyl ether of thiodiglycol having an EEW of about 117 and a viscosity of about 26 cks (0.000026 cm$^2$/s) at 25° C.

CATALYST is a 70 weight percent solution of ethyl triphenyl phosphonium acetate.acetic acid complex in methanol.

COMPARATIVE EXPERIMENT A

To a reaction vessel equipped with a nitrogen purge, stirrer, temperature control and condenser is added about 214 gms (1.1192 epoxy equiv.) of EPOXY RESIN B, about 11 gms (0.0482 carboxyl equiv.) of myristic acid. The contents are then heated to about 90° C. whereupon about 0.3 gm (0.0005 mole) of CATALYST is added. The temperature is increased to about 160° C. and maintained for about 1 hour. The resultant compound had a percent epoxide of about 20.2 and a viscosity of about 48.1 cks (0.0000481 cm$^2$/s) at 25° C.

COMPARATIVE EXPERIMENT B

To a reaction vessel equipped with a nitrogen purge, stirrer, temperature control and condenser is added about 215.7 gms (0.6822 epoxy equiv.) of EPOXY RESIN C, about 9.3 gms (0.0408 carboxyl equiv.) of myristic acid. The contents are then heated to about 90° C. whereupon about 0.3 gm (0.0005 mole) of CATALYST is added. The temperature is increased to about 160° C. and maintained for about 1 hour. The resultant compound had a percent epoxide of about 12.2 and a viscosity of about 77.6 cks (0.0000776 cm$^2$/s) at 25° C.

EXAMPLE 1

To a reaction vessel equipped with a nitrogen purge, stirrer, temperature control and condenser is added about 970 gms (4.1507 epoxy equiv.) of EPOXY RESIN A, about 30 gms (0.1498 carboxyl equiv.) of lauric acid. The contents are then heated to about 90° C. whereupon about 1 gm (0.0017 mole) of CATALYST is added. The temperature is increased to about 160° C. and maintained for about 1.17 hour. The resultant compound had a percent epoxide of about 17.1 and a viscosity of 1318 cps (1.318 Pa.s) at about 85° C.

EXAMPLE 2

To a reaction vessel equipped with a nitrogen purge, stirrer, temperature control and condenser is added about 953 gms (4.0779 epoxy equiv.) of EPOXY RESIN A, about 47 gms (0.2346 carboxyl equiv.) of lauric acid. The contents are then heated to about 90° C. whereupon about 1 gm (0.0017 mole) of CATALYST is added. The temperature is increased to about 160° C. and maintained for about 1.17 hour. The resultant compound had a percent epoxide of about 16.7 and a viscosity of about 1163 cps (1.163 Pa.s) at 85° C.

EXAMPLE 3

To a reaction vessel equipped with a nitrogen purge, stirrer, temperature control and condenser is added about 930 gms (3.9795 epoxy equiv.) of EPOXY RESIN A, about 69 gms (0.3445 carboxyl equiv.) of lauric acid. The contents are then heated to about 90° C. whereupon about 1 gm (0.0017 mole) of CATALYST is added. The temperature is increased to about 160° C. and maintained for about 1.17 hour. The resultant compound had a percent epoxide of about 15.6 and a viscosity of about 1045 cps (1.045 Pa.s) at 85° C.

EXAMPLE 4

To a reaction vessel equipped with a nitrogen purge, stirrer, temperature control and condenser is added about 899 gms (3.8468 epoxy equiv.) of EPOXY RESIN A, about 102 gms (0.5092 carboxyl equiv.) of lauric acid. The contents are then heated to about 90° C. whereupon about 1 gm (0.0017 mole) of CATALYST is added. The temperature is increased to about 160° C. and maintained for about 1.17 hour. The resultant compound had a percent epoxide of about 14.3 and a viscosity of about 805 cps (0.805 Pa.s) at 85° C.

EXAMPLE 5

To a reaction vessel equipped with a nitrogen purge, stirrer, temperature control and condenser is added about 218.5 gms (0.9349 epoxy equiv.) of EPOXY RESIN A, about 6.5 gms (0.056 carboxyl equiv.) of hexanoic acid. The contents are then heated to about 90° C. whereupon about 0.3 gm (0.0005 mole) of CATALYST is added. The temperature is increased to about 160° C. and maintained for 1 hour. The resultant compound had a percent epoxide of about 16.9 and a viscosity of about 1420 cps (1.420 Pa.s) at 85° C.

EXAMPLE 6

To a reaction vessel equipped with a nitrogen purge, stirrer, temperature control and condenser is added about 218 gms (0.9328 epoxy equiv.) of EPOXY RESIN A, about 7 gms (0.0538 carboxyl equiv.) of heptanoic acid. The contents are then heated to about 90° C. whereupon about 0.3 gm (0.0005 mole) of CATALYST is added. The temperature is increased to about 160° C. and maintained for about 1 hour. The resultant compound had a percent epoxide of about 17.1 and a viscosity of 1345 cps (1.345 Pa.s) at about 85° C.

EXAMPLE 7

To a reaction vessel equipped with a nitrogen purge, stirrer, temperature control and condenser is added about 217.5 gms (0.9307 epoxy equiv.) of EPOXY RESIN A, about 7.5 gms (0.0521 carboxyl equiv.) of octanoic acid. The contents are then heated to about 90° C. whereupon about 0.3 gm (0.0005 mole) of CATALYST is added. The temperature is increased to about 160° C. and maintained for about 1.25 hours. The resultant compound had a percent epoxide of about 17 and a viscosity of about 1365 cps (1.365 Pa.s) at 85° C.

EXAMPLE 8

To a reaction vessel equipped with a nitrogen purge, stirrer, temperature control and condenser is added about 216.7 gms (0.9273 epoxy equiv.) of EPOXY RESIN A, about 8.3 gms (0.0483 carboxyl equiv.) of decanoic acid. The contents are then heated to about 90° C. whereupon about 0.3 gm (0.0005 mole) of CATALYST is added. The temperature is increased to about 160° C. and maintained for about 1.2 hours. The resultant compound had a percent epoxide of about 16.9 and a viscosity of about 1275 cps (1.275 Pa.s) at 85° C.

EXAMPLE 9

To a reaction vessel equipped with a nitrogen purge, stirrer, temperature control and condenser is added about 215.3 gms (0.9213 epoxy equiv.) of EPOXY RESIN A, about 9.8 gms (0.0429 carboxyl equiv.) of myristic acid. The contents are then heated to about 90° C. whereupon about 0.3 gm (0.0005 mole) of CATALYST is added. The temperature is increased to about 160° C. and maintained for about 1 hour. The resultant compound had a percent epoxide of about 16.8 and a viscosity of about 1143 cps (1.143 Pa.s) at 85° C.

EXAMPLE 10

To a reaction vessel equipped with a nitrogen purge, stirrer, temperature control and condenser is added about 214.3 gms (0.9169 epoxy equiv.) of EPOXY RESIN A, about 10.7 gms (0.0377 carboxyl equiv.) of stearic acid. The contents are then heated to about 90° C. whereupon about 0.3 gm (0.0005 mole) of CATALYST is added. The temperature is increased to about 160° C. and maintained for 1 hour. The resultant compound had a percent epoxide of about 16.6 and a viscosity of about 1093 cps (1.093 Pa.s) at 85° C.

EXAMPLE 11

To a reaction vessel equipped with a nitrogen purge, stirrer, temperature control and condenser is added about 116.1 gms (0.9923 epoxy equiv.) of EPOXY RESIN D, about 22.5 gms (0.1125 carboxyl equiv.) of lauric acid. The contents are then heated to about 90° C. whereupon about 0.3 gm (0.0005 mole) of CATALYST is added. The temperature is increased to about 170° C. and maintained for about 1 hour. The resultant compound had a percent epoxide of about 19.8 and a viscosity of about 17 cks (0.000017 cm$^2$/s) at 25° C.

Table I provides a summary of the viscosity of the epoxy resins before and after reaction with the monocarboxylic acid.

TABLE I

| | | VISCOSITY SUMMARY | | | | |
|---|---|---|---|---|---|---|
| Example or Comp. Expt. | No. of Carbon Atoms in Acid | INITIAL VISCOSITY | | VISCOSITY AFTER REACTION WITH ACID | | PERCENT CHANGE |
| COMP. EXPT. A* | 14 | 40.5$^a$ | .0000405$^c$ | 48.1$^a$ | .0000481$^c$ | +19.5 |
| COMP. EXPT. B* | 14 | 70.1$^a$ | .0000701$^c$ | 77.6$^a$ | .0000776$^c$ | +10.7 |
| EX. 1 | 12 | 1528$^b$ | 1.528$^d$ | 1318$^b$ | 1.318$^d$ | −13.7 |
| EX. 2 | 12 | 1528$^b$ | 1.528$^d$ | 1163$^b$ | 1.163$^d$ | −23.9 |
| EX. 3 | 12 | 1528$^b$ | 1.528$^d$ | 1045$^b$ | 1.045$^d$ | −31.6 |
| EX. 4 | 12 | 1528$^b$ | 1.528$^d$ | 805$^b$ | .805$^d$ | −47.3 |
| EX. 5 | 6 | 1528$^b$ | 1.528$^d$ | 1420$^b$ | 1.420$^d$ | −7.1 |
| EX. 6 | 7 | 1528$^b$ | 1.528$^d$ | 1345$^b$ | 1.345$^d$ | −11.9 |
| EX. 7 | 8 | 1528$^b$ | 1.528$^d$ | 1365$^b$ | 1.365$^d$ | −10.7 |
| EX. 8 | 10 | 1528$^b$ | 1.528$^d$ | 1275$^b$ | 1.275$^d$ | −16.7 |
| EX. 9 | 14 | 1528$^b$ | 1.528$^d$ | 1143$^b$ | 1.143$^d$ | −25.2 |
| EX. 10 | 18 | 1528$^b$ | 1.528$^d$ | 1093$^b$ | 1.093$^d$ | −28.5 |
| EX. 11 | 12 | 26$^a$ | .000026$^c$ | 17$^a$ | .000017$^c$ | −34.6 |

*Not an example of the present invention.
$^a$Viscosity determined at 25° C. in centistokes (cks).
$^b$viscosity determined at 85° C. in centipoise (cps).
$^c$Meter$^2$/second (m$^2$/s).
$^d$Pascal-second (Pa.s).

EXAMPLE 12

Panels coated with compounds of the present invention are prepared by dissolving the resin in propylene glycol methyl ether acetate to about 80% solids, and then adding the curing agent. The panels are coated using a number 50 draw down bar. After coating the unpolished and untreated cold rolled steel 24 gauge (0.63 mm)×12 in.×4 in. (304.8 mm×101.6 mm) panel, it is placed into an oven at a temperature of about 125° C. for cure. After curing, the coating is tested in the following manner. The coating is cut in such a manner that about 100 small blocks are made. This is accomplished by cutting horizontal lines and vertical lines measuring about 1.5×1.5 cm total size. The amount of coated blocks remaining is recorded. The higher the amount of coating remaining the better the coating. The results are given in Table II.

TABLE II

| TEST NO. | RESIN USED | RESIN AMOUNT (g) | SOLVENT AMOUNT[a] (g) | AMOUNT OF CURING AGENT (g) | CURE TIME (min.) | CROSSHATCH TEST % OF COATING REMAINING |
|---|---|---|---|---|---|---|
| 1* | EPOXY RESIN A | 8 | 2 | 0.83[b] | 15[c] | 59 |
| 2 | EXAMPLE 6 | 8 | 2 | 0.77[b] | 15[c] | 80 |
| 3 | EXAMPLE 9 | 8 | 2 | 0.76[b] | 15[c] | 89 |
| 4 | EXAMPLE 10 | 8 | 2 | 0.75[b] | 15[c] | 86 |
| 5* | EPOXY RESIN A | 8 | 2 | 0.98[d] | 30[e] | 76 |
| 6 | EXAMPLE 6 | 8 | 2 | 0.91[d] | 30[e] | 0 |
| 7 | EXAMPLE 9 | 8 | 2 | 0.89[d] | 30[e] | 100 |
| 8 | EXAMPLE 10 | 8 | 2 | 0.88[d] | 30[e] | 89 |

*Not an example of the present invention.
[a]Solvent is propylene glycol methyl ether acetate.
[b]Triethylenetetramine with an amine hydrogen equivalent weight of 24.3.
[c]Cured 15 minutes at 125° C.
[d]Diaminocyclohexane with an amine hydrogen equivalent weight of 28.5.
[e]Cured 30 minutes at 125° C. then tested after about 20 hours at ambient temperature.

What is claimed is:

1. An adduct of (A) at least one polyglycidyl ether of: (1) a compound containing an average of more than one hydroxyl group per molecule and also at least one cycloalkadiene or oligomer of a cycloalkadiene per molecule or (2) a compound represented by the formula HO—(—A—Y—)$_n$—A—OH wherein each A is independently a divalent hydrocarbyl group having from about 2 to about 6 carbon atoms; each Y independently is —S— or —S—S—; and n has a value from 1 to about 11; and (B) at least one aliphatic monocarboxylic acid containing 6 to 18 carbon atoms per molecule; wherein components (A) and (B) are present in amounts which provide a ratio of carboxylic acid groups per epoxide group of from about 0.01:1 to about 0.2:1.

2. An adduct of claim 1 wherein
   (a) component (A) is an epoxy resin represented by the following formulas II, or III:

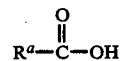

FORMULA II

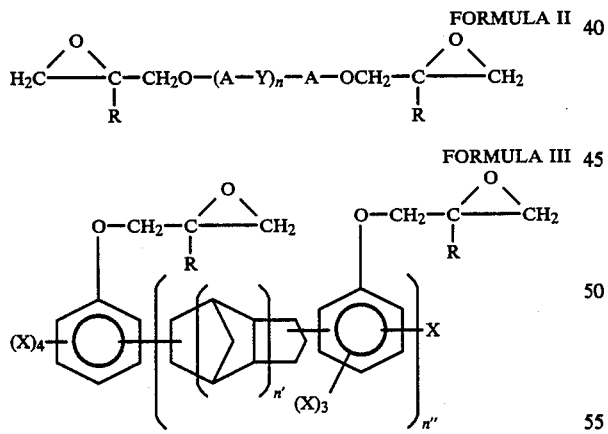

FORMULA III wherein each A is independently a divalent hydrocarbyl group having from about 2 to about 6 carbon atoms; each R is independently hydrogen or an alkyl group having from 1 to about 4 carbon atoms; each X is independently hydrogen, an aliphatic hydrocarbon group containing from 1 to about 6 carbon atoms, or a halogen; each Y independently is —S— or —S—S—; n has a value from 1 to about 11; n' has a value from zero to about 4; and n" has a value from about 1 to about 4;
   (b) component (B) is a compound represented by the following Formula I $$R^a-\overset{\overset{O}{\|}}{C}-OH \qquad \text{Formula I}$$

wherein $R^a$ is a monovalent aliphatic hydrocarbon group having from 5 to 17 carbon atoms; and
   (c) components (A) and (B) are employed in amounts which provide a ratio of equivalent of carboxylic acid to epoxide equivalent of from about 0.02:1 to about 0.15:1.

3. An adduct of claim 2 wherein
   (a) in component (A) each A is independently a divalent hydrocarbyl group having from about 2 to about 5 carbon atoms; each R is hydrogen; each X is independently hydrogen, an aliphatic hydrocarbon group containing from 1 to about 6 carbon atoms, or chlorine or bromine; n has a value from 1 to about 7; n' has a value from about 1 to about 3; and n" has a value from about 1 to about 3;
   (b) in component (B) $R^a$ has from about 7 to about 15 carbon atoms; and
   (c) components (A) and (B) are employed in amounts which provide a ratio of equivalent of carboxylic acid to epoxide equivalent of from about 0.03:1 to about 0.1:1.

4. An adduct of claim 3 wherein
   (a) in component (A) each A is independently a divalent hydrocarbyl group having from about 2 to about 4 carbon atoms; n has a value from 1 to about 5; n' has a value from about 1 to about 2 and n" has a value from about 1 to about 2; and
   (b) in component (B) $R^a$ has from about 8 to about 13 carbon atoms.

5. An adduct of claim 4 wherein
   (a) component (A) is a polyglycidyl ether of a phenol-dicyclopentadiene hydrocarbon resin or a diglycidyl ether of thiodiglycol; and
   (b) component (B) is lauric acid.

6. A thermosettable composition comprising (A) one or more adducts of claim 1 and (B) a curing amount of at least one suitable curing agent for component (A).

7. A thermosettable composition of claim 6 wherein said curing agent is a polyamine.

8. A thermosettable composition of claim 7 wherein said curing agent is triethylenetetramine.

9. A thermosettable composition comprising (A) one or more adducts of claim 2 and (B) a curing amount of at least one suitable curing agent for component (A).

10. A thermosettable composition of claim 9 wherein said curing agent is a polyamine.

11. A thermosettable composition of claim 10 wherein said curing agent is triethylenetetramine.

12. A thermosettable composition comprising (A) one or more adducts of claim 3 and (B) a curing amount of at least one suitable curing agent for component (A).

13. A thermosettable composition of claim 12 wherein said curing agent is a polyamine.

14. A thermosettable composition of claim 13 wherein said curing agent is triethylenetetramine.

15. A thermosettable composition comprising (A) one or more adducts of claim 4 and (B) a curing amount of at least one suitable curing agent for component (A).

16. A thermosettable composition of claim 15 wherein said curing agent is a polyamine.

17. A thermosettable composition of claim 16 wherein said curing agent is triethylenetetramine.

18. A thermosettable composition comprising (A) one or more adducts of claim 5 and (B) a curing amount of at least one suitable curing agent for component (A).

19. A thermosettable composition of claim 18 wherein said curing agent is a polyamine.

20. A thermosettable composition of claim 19 wherein said curing agent is triethylenetetramine.

21. The product resulting from curing the thermosettable composition of claim 6.

22. The product resulting from curing the thermosettable composition of claim 7.

23. The product resulting from curing the thermosettable composition of claim 8.

24. The product resulting from curing the thermosettable composition of claim 9.

25. The product resulting from curing the thermosettable composition of claim 10.

26. The product resulting from curing the thermosettable composition of claim 11.

27. The product resulting from curing the thermosettable composition of claim 12.

28. The product resulting from curing the thermosettable composition of claim 13.

29. The product resulting from curing the thermosettable composition of claim 14.

30. The product resulting from curing the thermosettable composition of claim 15.

31. The product resulting from curing the thermosettable composition of claim 16.

32. The product resulting from curing the thermosettable composition of claim 17.

33. The product resulting from curing the thermosettable composition of claim 18.

34. The product resulting from curing the thermosettable composition of claim 19.

35. The product resulting from curing the thermosettable composition of claim 20.

36. A process for reducing the viscosity of a polyglycidyl ether of: (1) a compound containing an average of more than one hydroxyl group per molecule and also at least one cycloalkadiene or oligomer of a cycloalkadiene per molecule or (2) a compound represented by the formula HO—(—A—Y—)$_n$—A—OH wherein each A is independently a divalent hydrocarbyl group having from about 2 to about 6 carbon atoms; each Y independently is —S— or —S—S—; and n has a value from 1 to about 11, which process comprises reacting said polyglycidyl ether with at least one aliphatic monocarboxylic acid containing 6 to 18 carbon atoms per molecule in an amount which provides a ratio of carboxylic acid groups per epoxide group of from about 0.01:1 to about 0.2:1.

37. A process of claim 36 wherein
(a) said polyglycidyl ether is an epoxy resin represented by the following Formulas II, or III:

FORMULA II
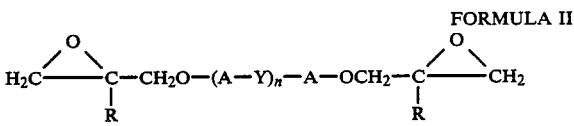

FORMULA III
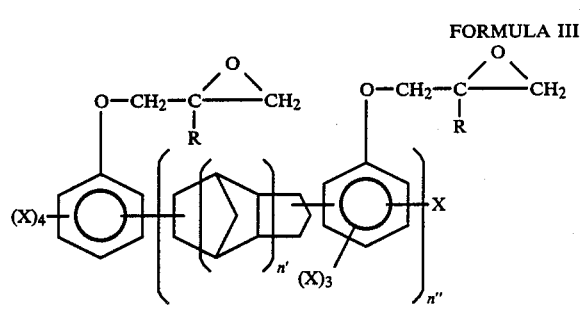

wherein each A is independently a divalent hydrocarbyl group having from about 2 to about 6 carbon atoms; each R is independently hydrogen or an alkyl group having from 1 to about 4 carbon atoms; each X is independently hydrogen, an aliphatic hydrocarbon group containing from 1 to about 6 carbon atoms, or a halogen; each Y independently is —S— or —S—S—; n has a value from 1 to about 11; n' has a value from zero to about 4; and n" has a value from about 1 to about 4;

(b) aliphatic monocarboxylic acid is an acid represented by the following Formula I

Formula I wherein R$^a$ is a monovalent aliphatic hydrocarbon group having from 5 to 17 carbon atoms; and (c) said polyglycidyl ether and acid are employed in amounts which provide a ratio of equivalent of carboxylic acid to epoxide equivalent of from about 0.02:1 to about 0.15:1.

38. A process of claim 37 wherein
(a) in the formulas for said polyglycidyl ether, each A is independently a divalent hydrocarbyl group having from about 2 to about 5 carbon atoms; each R is hydrogen; each X is independently hydrogen, an aliphatic hydrocarbon group containing from 1 to about 6 carbon atoms, or chlorine or bromine; n has a value from 1 to about 7; n' has a value from about 1 to about 3; and n" has a value from about 1 to about 3;

(b) in the formula for said aliphatic monocarboxylic acid, R$^a$ has from about 7 to about 15 carbon atoms; and (c) said polyglycidyl ether and acid are employed in amounts which provide a ratio of equivalent of carboxylic acid to epoxide equivalent of from about 0.03:1 to about 0.1:1.

39. A process of claim 38 wherein
(a) in the formulas for said polyglycidyl ether, each A is independently a divalent hydrocarbyl group having from about 2 to about 4 carbon atoms; n has a value from 1 to about 5; n' has a value from about 1 to about 2; and n" has a value from about 1 to about 2; and (b) in the formula for said aliphatic monocarboxylic acid, $R^a$ has from about 8 to about 13 carbon atoms.

40. A process of claim 39 wherein
(a) said polyglycidyl ether is a polyglycidyl ether of a phenol-dicyclopentadiene hydrocarbon resin or a diglycidyl ether of thiodiglycol; and
(b) said aliphatic monocarboxylic acid is lauric acid.

* * * * *